US008567645B1

(12) United States Patent
Orr

(10) Patent No.: US 8,567,645 B1
(45) Date of Patent: Oct. 29, 2013

(54) LIQUID DISPENSING APPARATUS

(75) Inventor: Timothy E. Orr, Redding, CA (US)

(73) Assignee: Redding Machine Development LLC, Redding, CA (US)

( * ) Notice: Subject to any disclaimer, the term of this patent is extended or adjusted under 35 U.S.C. 154(b) by 104 days.

(21) Appl. No.: 12/926,748

(22) Filed: Dec. 8, 2010

(51) Int. Cl.

| | |
|---|---|
| ***B67D 3/00*** | (2006.01) |
| ***B67D 7/06*** | (2010.01) |
| ***F16L 37/28*** | (2006.01) |

(52) U.S. Cl.
USPC ........ 222/183; 222/505; 222/105; 222/185.1; 251/149.9

(58) Field of Classification Search
USPC ........................ 222/105, 185.1, 505, 95, 183; 251/149.9
See application file for complete search history.

(56) References Cited

U.S. PATENT DOCUMENTS

| | | | | |
|---|---|---|---|---|
| 6,375,048 | B1 * | 4/2002 | van der Meer et al. | 222/396 |
| 6,446,845 | B1 * | 9/2002 | Steiger | 222/509 |
| 6,454,131 | B1 * | 9/2002 | Van Der Meer et al. | 222/95 |
| 6,598,763 | B2 * | 7/2003 | Van Der Meer et al. | 222/94 |
| 7,011,233 | B2 * | 3/2006 | Drennow | 222/105 |
| 2007/0138202 | A1 * | 6/2007 | Evers | 222/95 |
| 2009/0078721 | A1 * | 3/2009 | Hoffman et al. | 222/1 |

* cited by examiner

*Primary Examiner* — Kevin P Shaver
*Assistant Examiner* — Stephanie E Williams
(74) *Attorney, Agent, or Firm* — Theodore J. Bielen, Jr.

(57) ABSTRACT

With a force actuated valve operator utilizing a base member. The base member holds and orients a tap and connected container to allow accessibility of a force actuator valve operator of the same. The base member includes a passageway for conducting liquid from the tap to a spout. A holder positions the base member on the first side of a partition such that the force actuated valve operator of the tap lies adjacent the first side of the partition. The spout linked to the passageway of the base member extends to the second side of the partition. An arm is operated by a handle. The arm and handle are supported by the partition such that the arm contacts the force actuated valve operator of the tap to release liquid from the container to the spout.

15 Claims, 3 Drawing Sheets

LIQUID DISPENSING APPARATUS

BACKGROUND OF THE INVENTION

The present invention relates to a novel and useful apparatus for dispensing liquid stored in a container.

Liquids are generally stored in bottles, cans, tanks and other containers and are retrieved by various devices. In the case of small containers, the liquid is obtained by simply lifting and tilting the container to allow liquid to flow via gravity through a spout or opening. Larger containers require valve operated taps.

In recent times, many liquids such as water, and alcohol beverages such as wine have been packaged in plastic bags which are fitted with a force operated tap. Such liquid filled bags are generally shipped in a box and dispensed by operation of the tap. In the case of wines, bags filed with wine having a tap have been placed in barrel facade to mimic actual barrels which contain wines and the like. To conduct the liquid from the plastic bag within the barrel façade, tubes have been used to communicate with the tap of the plastic bag and a beer-styled tap as been connected to such tube on the end of the barrel facade. In addition, gases are employed to urge the liquid from such containers. Also, the tap associated with the bag remains open at all times and is inconveniently located relative to the barrel end portion having the beer-like tap. Unfortunately, in the case of wine, a body of wine sits in the tube and the tap remains open to air, which tends to spoil the taste of the wine once it is dispensed from the bag within the barrel facade.

A liquid dispensing apparatus which conveniently and efficiently dispenses liquids from a container, such as a flexible bag, would be a notable advance in the food and beverage field.

SUMMARY OF THE INVENTION

In accordance with the present invention a novel and useful liquid dispensing apparatus is herein provided.

The apparatus of the present invention is used in conjunction with a container, which may be flexible, that has a connected tap with a force actuated valve operator. The apparatus includes a base member having a support for the tap. Such support may include a channel which interacts with a disk or collar found on the tap. Flanges on the base member lock the tap into place on the base member and also provide a sonic indication that such locking has taken place. The base member support positions the force actuated valve operator of the tap in an accessible orientation. The base member also includes a passageway which conducts liquid from the tap to an exit from the passageway. A spout is linked to the exit from the passageway to receive liquid that move from the container, through the tap, and through the base member passageway. The base member also includes an air vent, which in conjunction with the angle of the spout relative to the base member, prevents dripping once the tap valve is actuated.

A partition is also found in the present invention. The partition includes a first side and a second side. The partition may be adapted for mounting on a surface which is ascetically pleasing. For example, a partition may be mounted to the façade of a faux barrel, to provide the impression that the dispensing apparatus of the present invention is directly dispensing liquid from a barrel, rather than from a flexible container as is previously noted. The partition may be formed of any material which is rigid or semi-rigid such as metal, plastic and the like.

A holder is linked to the partition and positions the base member at the first side thereof. Such positioning orients the force actuated valve operator of the tap such that the valve operator lies adjacent the first side of the partition. The spout of the base member is also extended to a position adjacent the second side of the partition to allow the spout to extend along the edge of the partition or through an opening thereof.

An arm is also at least partially supported by the partition and is moveable to contact and actuate the valve operator, which lies adjacent the first side of the partition. The arm may comprise a pivoting element moving upon the application of force. Such force may be applied by a handle which itself pivots relative to the partition. The arm may move within a guide formed in a supplied housing. The arm is capable of pressing or contacting the valve operator of the tap upon application of force on the rotatable handle.

The holder may further include at least one shaft extending outwardly from the first side of the partition. An aperture or apertures in the base member slidingly engage the shaft or shafts to stabilize the base member on the first side of the partition. The holder also includes a springy flap that extends from the first side of the partition and presses against the base member during sliding engagement of the shaft with the base member aperture. In this regard, the springy flap may include a protrusion which engages a recess in the base member that confines the protrusion and locks the base member in place. Thus, the holder is firmly held to the partition in a position to allow the handle operated arm, supported by the housing to accurately contact the operator of the tap. Such contact, thus, actuates the dispensing apparatus of the present invention. Needless to say, the holder of the apparatus of the present invention removably supports the base member at the first side of the partition. In this manner, the base member may be easily installed and removed from the partition for cleaning purposes.

It may be apparent that a novel and useful dispensing apparatus for liquid stored in a container has been hereinabove described.

It is therefore an object of the present invention to provide a dispensing apparatus for liquids stored in a container which accurately and efficiently dispenses liquid from the container.

Another object of the present invention is to provide a dispensing apparatus for liquids which eliminates the use of tubes and pressurized gasses found in prior art devices.

A further object of the present invention is to provide a dispensing apparatus for liquids stored in a container which eliminates dead storage of such liquid outside the container prior to dispensing.

Another object of the present invention is to provide a dispensing apparatus which does not permit the spoilage of the liquid in the dispensing apparatus prior to use.

Yet another object of the present invention is to provide a dispensing apparatus for liquid stored in a container which may be mounted to an mock object such as a faux barrel.

A further object of the present invention is to provide a dispensing apparatus for liquid stored in a container which is easily assembled and cleaned after usage.

Yet another object of the present invention is to provide a dispensing apparatus for liquid which reduces the cost of delivery of such liquid to the consumer.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
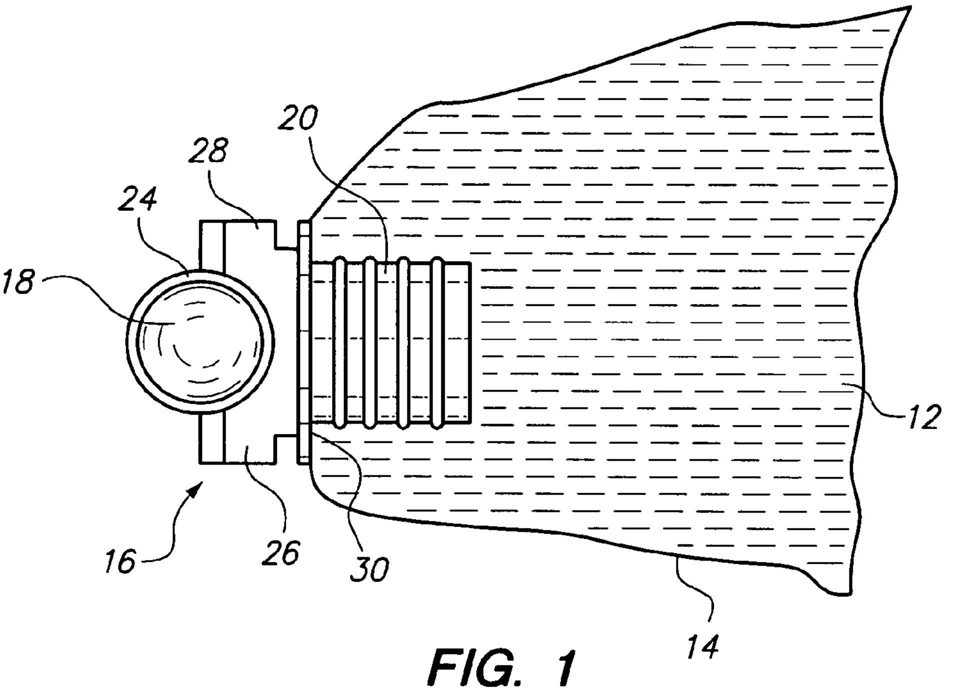
FIG. 1 is a top plan view of the prior art tap used in conjunction with a flexible container of liquid.
Figure 5:
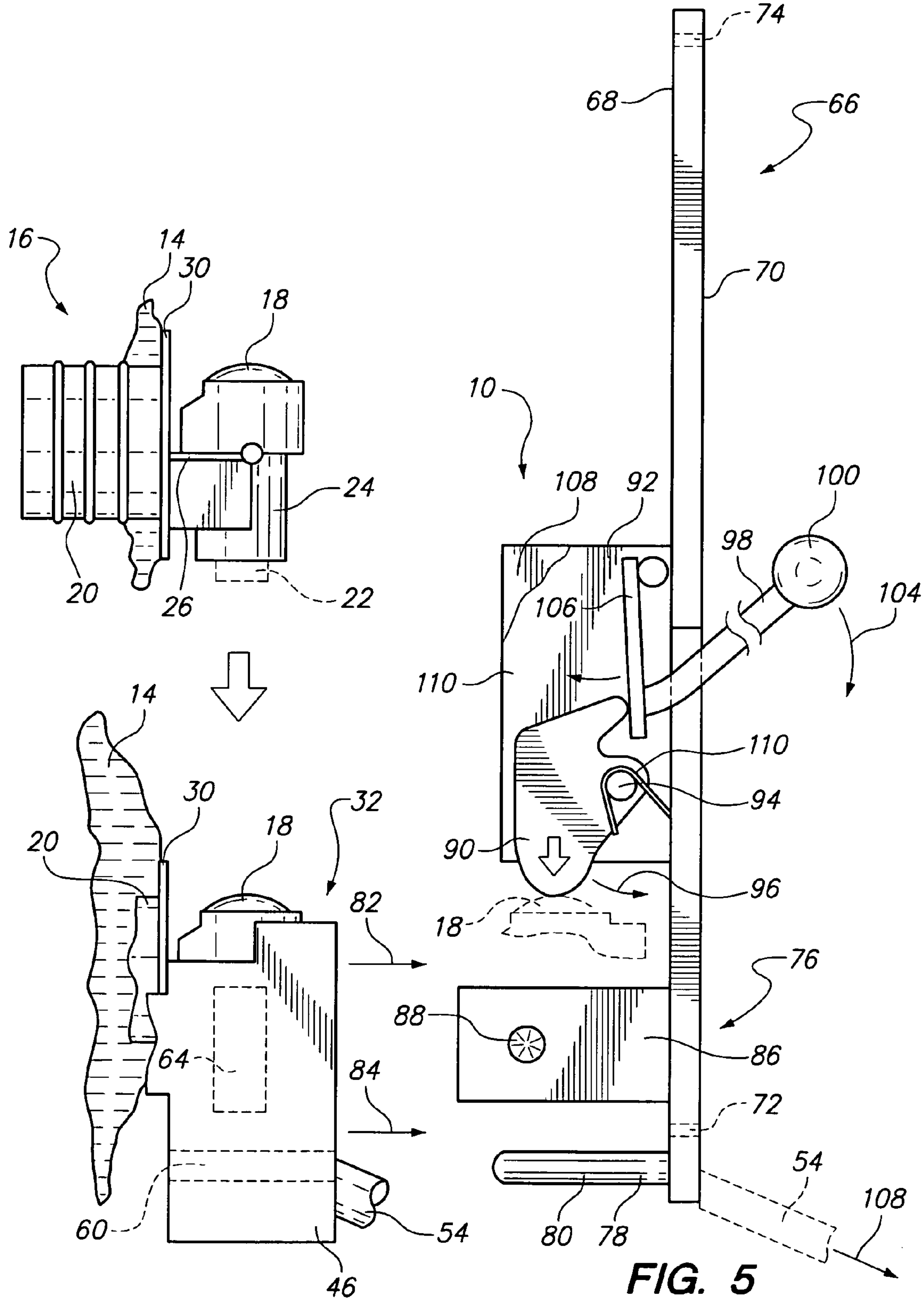
FIG. 5 is a side elevational view depicting the partition and arm actuated by a handle used to contact the valve operator of the tap, the tap being depicted repeatedly in exploded view with a portion of the tap depicted in contact with the arm, in phantom.

An embodiment of the invention as a whole is depicted in the drawings by reference character 10, best seen in FIG. 5. The dispensing apparatus 10 of the present invention is intended to dispense liquid, such as liquid 12 found in a container such as a container 14, FIG. 1. It may be seen from FIG. 1, container 14 is flexible and may take the form of a bag of polymeric material. Liquid 12 may take the form of water, detergent, wine, and the like. Container 14 is normally combined with a tap 16 of conventional configuration. Tap 16 may be variously configured. For example, tap 16 may take the form of one manufactured under the designation FLEXTAP by Scholle Packaging, of North lake, Ill., one manufactured under the designation VITOP by the Smurfit Kappa Group of Alessandria, Italy and the like. In the present embodiment, tap 16 may take the form of one manufactured by World Wide Dispensers of London England under the Trademark VINI-TAP. Such tap 16 is commonly used where liquid 12 is a wine or other distilled spirits. Tap 16 is formed with a valve operator 18 which is force actuated. Tap 16 also includes an entrance nozzle 20 and an exit nozzle 22, depicted in phantom on FIG. 5. That is to say, once valve operator 18 is pressed or forced upon, exit nozzle 22 distends from body portion 24 of tap 16 to release liquid 12 from container 14. Tap 14 also includes wings 26 and 28 which serve as a structural interconnection between body portion 24 and disk 30, which aids in the support of flexible container 14, FIG. 1.

Figure 2:
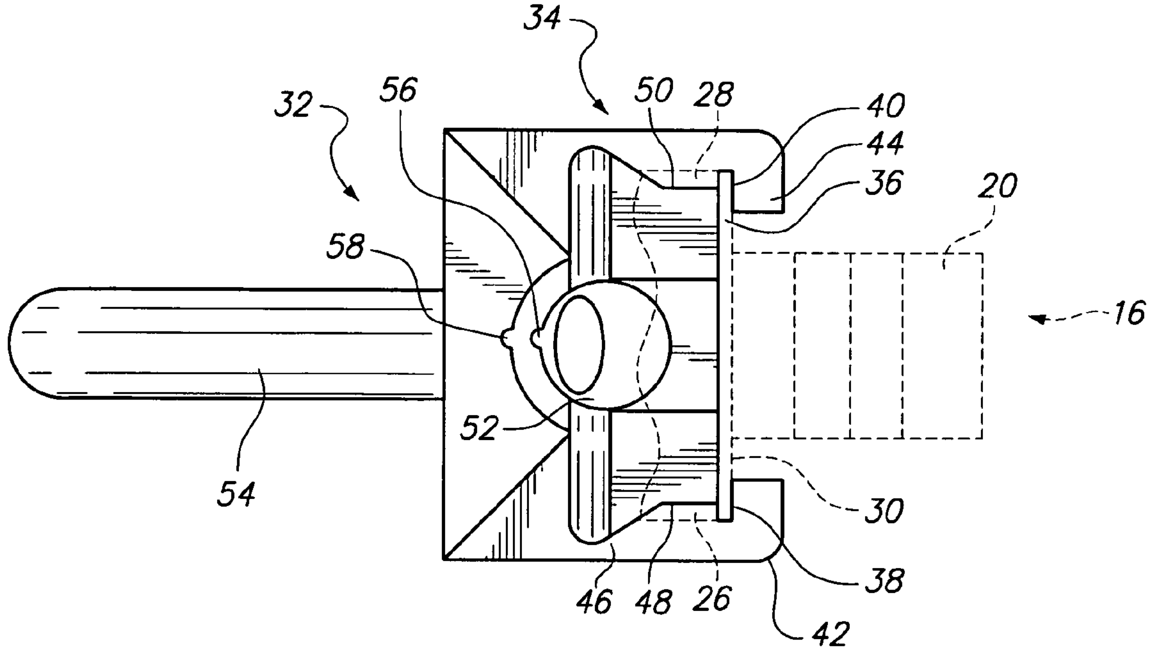
FIG. 2 is a top plan view of the base member of the present invention which mates with the tap of FIG. 1.
Figure 3:
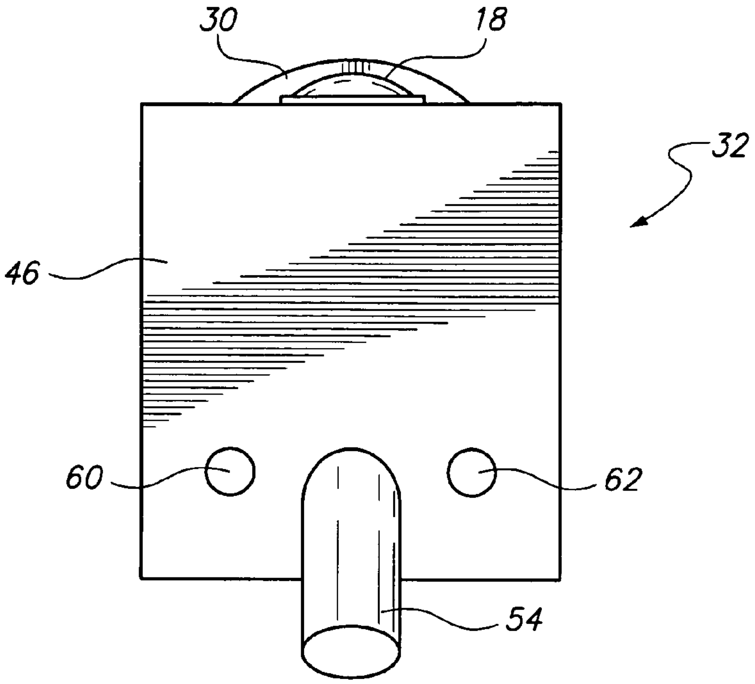
FIG. 3 is a front elevational view of the base member of the present invention mated with the tap.
Figure 4:
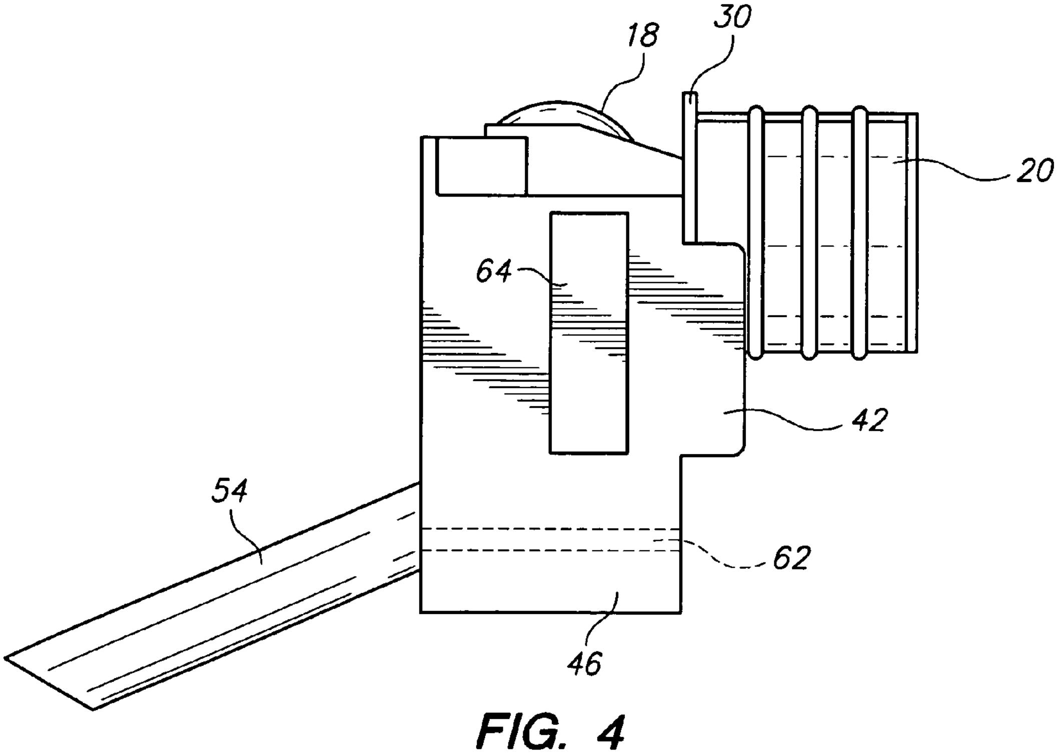
FIG. 4 is a side elevational view of the base member of the present invention mated with the tap of FIG. 1.

With reference to FIG. 2, it may be apparent that apparatus 10 includes as one of its elements a base member 32. Base member 32 is constructed with a support 34 for tap 16. Support 34 may take the form of a channel 36 formed by a pair of grooves 38 and 40 which run along extensions 42 and 44 of block 46. That is to say, disk 30 of tap 16 slides into channel 36. Wings 26 and 28 of tap 16 snap into place under flanges 48 and 50 when tap 16 is pressed downwardly upon base member 32 as depicted in FIG. 2. Flanges 26 and 28 are flexible enough to deformably fit under flanges 48 and 50 and, also, to produce an audible snapping sound when this occurs. Such sound serves as feedback to the person, assembling tap 16 with base member 32, that tap 16 is securely being held by base member 32. Base member 32 is also formed with a passageway 52 that communicates with a spout 54. Air vents 56 and 58 prevent dripping when liquid 12 flows through base member 12 passageway 52 and spout 54, which will be described in greater detail as the specification continues. With reference to FIG. 3, it may be observed that base member 32 is formed with apertures 60 and 62 which extend completely through block 46. In addition, FIG. 4 reveals a recess 64 formed on a side of block 46. The significance of apertures 60 and 62, as well as recess 64 will be discussed hereinafter.

A partition 66 is also included in the apparatus 10 of the present invention. Partition 66 possesses a first side 68 and second side 70. Partition 66 is depicted in FIG. 5, as a metallic plate which may be mounted to a surface for use. For example, partition 66 may be placed on the end of a faux barrel (not shown) to mimic the dispensing of wine with apparatus 10 in conjunction with flexible container 14 and tap 16, which would lie within such faux barrel. For example, openings 72 and 74 permit the use of fasteners such as screws (not shown) to attach partition 66 to a desired surface.

Holder 76 is linked to partition 66 and includes shafts 78 and 80 (shown partially on FIG. 5) which extend from first side 68 of partition 66. Shafts 78 and 80 engage apertures 60 and 62 through block 46. Directional arrows 82 and 84 indicate the movement of block 46 toward shaft 78 and 80 and engagement of the same. In addition, springy flap 86 extends from first side 68 of partition 66 and presses against base member 32 during the sliding engagement of apertures 60 and 62 with shaft 78 and 80, respectively. Further more, springy flap 86 possesses a protrusion 88 which is confined within recess 64 of base member 32 to lock base member 32 in place along first side 68 of partition 66. It should be realized that the positioning of base member 32 to the first side 68 of partition 66 is such that valve operator 18 of tap 16 is accessible. FIG. 5 represents, in phantom, the ultimate positioning of valve operator 18 along first side 68 of partition 66 when base member 32 is supported by holder 76.

An arm 90 is held in a housing 92 to first side 68 of partition 66 by any suitable means, such as gluing, the use of fasteners, and the like as depicted in FIG. 5. Arm 90 is pivoted about axis pin 94 according to directional arrow 96. Such pivoting causes the contact between arm 90 and valve operator 18, illustrated in FIG. 5. A handle 98 having a grip 100 is also supported by housing 92 and includes a pivot pin 102 such that the pulling down of handle 98, directional arrow 104, rotates a plate 106 attached to handle 98, and moves the same against a portion of arm 90 to rotate arm 90 about pivot pin 94. In other words, pulling of handle 98 via grip 100 causes arm 90 to depress valve operator 18 when it is in place, through holder 76, on the first side of 68 of partition 66. It should be noted that handle 98, as well as spout 54, extend to the second side 70 of partition 66. Housing 92 includes a pair of elements 108 and 110 which lie next to each other and forms a guide or slot for arm 90 in its movement about pivot pin 94 according to directional arrow 96. It should be realized that the handle and arm arrangement, herein above described, may result in a motion on arm 90 to produce a sideways rotational force, an outward force, an inward force, and the like, dependent on the type of tap employed with bag container 14.

In operation, the user attaches tap 16 to base member 32 by sliding disk 30 into channel 36, specifically along grooves 38 and 40. Wings 26 and 28 of tap 16 snap into place under flanges 50 and 52 of base member 32 in an audible manner. Thus, tap 16 and container 14 holding liquid 12 and base member 32 form a unitary member at this point. Such unitary member is then attached to holder 76 by the engagement of shafts 78 and 80 with apertures 60 and 62 of base member 32, and the engagement of protrusion 88 of springy flap 86 with recess 64 located on the side portion of block 46 of base member 32. Thus, the attachment of base member 32 and tap 16 to partition 66 through holder 76 fixes valve operator 18 of tap 16 directly under arm 90. The downward motion of handle 98, according to directional arrow 104, via grip 100 causes the rotation of plate 106 against arm 90 and initiates the pivoting of arm 90 about pivot pin 94 to depress valve operator 18. Such depression of valve operator 18 opens the same and allows liquid 12 to flow from container 14, through tap 16, and in to passageway 52 of base member 24. Liquid is then free to enter spout 54 and exit spout 54, according to directional arrow 108 of FIG. 5. Spring 110 about pivot pin 94 returns handle 98 to an upward position and allows valve operator 18 to close, Thus, the closing of valve operator 18 handle 98 is spring operated. Apparatus 10 is then ready to dispense liquid 12 from container 14, again, upon the movement of handle 98 as heretofore described. It should be noted that base member 32 is easily detachable from holder 76 and tap 16 is readily detachable from base member 32. In this manner, tap 16 and the attached container 14 may be interchanged with a similar one and base member 32 may be cleaned before reattachment of the same to partition 66 via holder 76.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A dispensing apparatus for liquid stored in a container having a tap with a force actuated valve operator; comprising:

a. a base member, said base member including a support for the tap, said support positioning the force actuated valve operator of the tap in an accessible orientation, said base member further including a passageway for conducting liquid from the tap to an exit from said passageway;

b. a spout, said spout linked to said exit from said passageway of said base member;

c. a partition, said partition including a first side and a second side;

d. a holder, said holder being linked to said partition, said holder positioning said base member at said first side of said partition with the force actuated valve operator of the tap of the container lying adjacent said first side of said partition and said spout extending to a position on said second side of said partition;

e. a moveable arm, said moveable arm being at least partially supported to said partition, said moveable arm being positioned at said first side of said partition, said moveable arm and the valve operator lying apart from each other, said moveable arm being configured to actuate the valve operator lying apart from said moveable arm upon movement of said moveable arm, and f. a handle associated with said arm, said handle moving said arm upon the application of a force thereupon, at least a portion of said handle lying adjacent said second side of said partition.

2. The apparatus of claim 1 in which said holder is removably supporting said base member at said first side of said partition.

3. The apparatus of claim 1 in which said handle comprises a rotatable member having a projection for moving said moveable arm into contact with and exerting a force upon the operator of the valve of the tap.

4. The apparatus of claim 3 in which said moveable arm comprises a pivoting element rotating upon the application of force by said handle rotatable member.

5. The apparatus of claim 1 which further comprises a guide for said arm during movement of said arm.

6. The apparatus of claim 1 in which said base member support includes a channel for capturing a portion of the tap.

7. The apparatus of claim 1 in which said base member support includes a flange for generating a sound upon contact of the tap with said support.

8. The apparatus of claim 1 in which said holder further includes a shaft extending outwardly from said first side of said partition, an aperture in said base member for slidingly engaging said shaft, and a springy flap extending from said first side of said partition and pressing against said base member during sliding engagement of said shaft and said base member aperture.

9. The apparatus of claim 8 in which said springy flap includes a protrusion and said base member includes a recess for confining said protrusion.

10. The apparatus of claim 8 in which said holder is removably supporting said base member at said first side of said partition.

11. The apparatus of claim 8 in which said handle comprises a rotatable member having a projection for moving said moveable arm into contact with and exerting a force upon the operator of the valve of the tap.

12. The apparatus of claim 11 in which said arm comprises a pivoting element rotating upon the application of force by said handle rotatable member.

13. The apparatus of claim 8 which further comprises a guide for said arm during movement of said arm.

14. The apparatus of claim 8 in which said holder includes a channel for capturing a portion of the tap.

15. The apparatus of claim 8 in which said support includes a flange for generating a sound upon contact of the tap with said support.

* * * * *